(12) United States Patent
Bordy

(10) Patent No.: US 11,415,505 B2
(45) Date of Patent: Aug. 16, 2022

(54) METHOD AND SYSTEM FOR OBSERVING A SAMPLE UNDER AMBIENT LIGHTING

(71) Applicant: Commissariat A L'Energie Atomique et aux Energies Alternatives, Paris (FR)

(72) Inventor: Thomas Bordy, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 252 days.

(21) Appl. No.: 16/583,677

(22) Filed: Sep. 26, 2019

(65) Prior Publication Data
US 2020/0103337 A1 Apr. 2, 2020

(30) Foreign Application Priority Data
Sep. 28, 2018 (FR) ...................... 18 58952

(51) Int. Cl.
*G01N 21/25* (2006.01)
*G01N 21/27* (2006.01)
*H04N 5/33* (2006.01)
*G01N 21/17* (2006.01)

(52) U.S. Cl.
CPC ........... *G01N 21/255* (2013.01); *G01N 21/27* (2013.01); *H04N 5/332* (2013.01); *G01N 2021/1772* (2013.01)

(58) Field of Classification Search
CPC ................. G01N 21/255; G01N 21/27; G01N 2021/1772; H04N 5/332
See application file for complete search history.

(56) References Cited

U.S. PATENT DOCUMENTS

| 5,307,161 A * | 4/1994 | Miyamoto ............. G01N 21/17 348/79 |
| 2009/0137908 A1* | 5/2009 | Patwardhan ......... A61B 5/0071 600/476 |

(Continued)

FOREIGN PATENT DOCUMENTS

WO WO 2016/078946 A1 5/2016

OTHER PUBLICATIONS

Preliminary French Search Reported dated Jun. 20, 2019 in French Appliaction 18 58952 filed on Sep. 28, 2018 (with English Translation of Categories of Cited Documents & Written Opinion ).

*Primary Examiner* — Sunghyoun Park
(74) *Attorney, Agent, or Firm* — Oblon, McClelland, Maier & Neustadt, L.L.P.

(57) ABSTRACT

A method for observing a sample is placed between a light source and an image sensor, comprising at least 10000 pixels, the light source emits an illuminating beam, which propagates to the sample, the light beam is emitted in an illumination spectral band ($\Delta\lambda_{11}$) lying above 800 nm, the method comprising the following steps: (a) illuminating the sample with the light source; (b) acquiring an image of the sample ($I_0$) with the image sensor, no image-forming optics being placed between the sample and the image sensor; and (c) the image sensor being configured such that it has a detection spectral band ($\Delta\lambda_{20}$), which blocks wavelengths in the visible spectral band, such that the image may be acquired in ambient light.

19 Claims, 5 Drawing Sheets

(56) References Cited

U.S. PATENT DOCUMENTS

| | | | |
|---|---|---|---|
| 2010/0208339 A1* | 8/2010 | Kleppe | G02B 21/06 |
| | | | 359/385 |
| 2015/0051498 A1* | 2/2015 | Darty | G16H 50/50 |
| | | | 600/477 |
| 2015/0077760 A1* | 3/2015 | Koerner | A61B 5/0066 |
| | | | 356/496 |
| 2017/0031033 A1* | 2/2017 | Makarov | H01J 49/0004 |
| 2017/0212343 A1* | 7/2017 | Morel | G03H 1/0005 |
| 2017/0317125 A1 | 11/2017 | Bordy | |
| 2018/0046139 A1 | 2/2018 | Stahl et al. | |
| 2018/0172906 A1* | 6/2018 | Rothberg | G01M 11/35 |
| 2018/0180527 A1* | 6/2018 | Zhou | G01N 15/1434 |
| 2019/0086866 A1* | 3/2019 | Douet | G03H 1/041 |

\* cited by examiner

METHOD AND SYSTEM FOR OBSERVING A SAMPLE UNDER AMBIENT LIGHTING

TECHNICAL FIELD

The technical field of the invention is related to the observation of a sample, in particular a biological sample, with an imaging device operating in ambient light.

PRIOR ART

The observation of samples, and in particular biological samples, by lensless imaging has seen substantial development over the last ten years. This technique allows a sample to be observed by placing it between a light source and an image sensor, without placing any image-forming lenses between the sample and the image sensor. Thus, the image sensor collects an image of a light wave transmitted by the sample, without conjugation between the image sensor and the sample.

Document WO2008090330 for example describes a device allowing biological particles to be observed by lensless imaging. The biological particles are for example cells. The device allows an interference pattern the morphology of which allows the type of cell to be identified to be associated with each cell. Lensless imaging would thus appear to be a simple and inexpensive alternative to a conventional microscope. In addition, its field of observation is clearly much larger than it is possible for that of a microscope to be.

In the visible domain, lensless imaging has been applied to examine samples containing particles, in particular biological particles or cells, for characterization purposes. Examples may be found in WO2017178723, WO2016151248, or WO2016151249. The use of lensless imaging to count particles is described in WO2018115734 or in WO2015166009, or in WO2018060589.

Documents WO2016189257 or EP 319 9941 described the use of lensless imaging to characterize tissue slides of pathology-slide type.

In the aforementioned documents, the lensless imaging is implemented using wavelengths in the visible. In order to keep the ambient light at bay, the devices are such that the main components (light source, image sensor) and the sample are combined in a chamber that is impermeable to light.

The inventors propose a device that is simple to implement, and that allows the constraint on isolation of the sensor with respect to ambient light to be relaxed. A greater ease-of-use results therefrom.

SUMMARY OF THE INVENTION

A first subject of the invention is a method for observing a sample, the sample being placed between a light source and an image sensor, preferably comprising at least 10000 pixels, the light source emitting an illuminating beam, which propagates to the sample, the illuminating beam being emitted in an illumination spectral band lying above 800 nm, the method comprising the following steps:
  a) illuminating the sample with the light source;
  b) acquiring an image of the sample with the image sensor;
the image sensor being configured such that it has a detection spectral band that blocks wavelengths in a visible spectral band, lying at least between 400 nm and 750 nm, or at least between 400 nm and 780 nm.

Thus, the image may be acquired in ambient light, the image sensor being exposed to light in the visible spectral band.

According to one embodiment, no image-forming optics are placed between the sample and the image sensor. According to another embodiment, the device comprises an optical system, placed between the sample and the image sensor, the optical system having an object focal plane and an image focal plane. The device is then such that:
  the object focal plane is offset with respect to a plane in which the sample lies, by a focusing distance, which is preferably comprised between 10 µm and 2 mm;
  and/or the image focal plane is offset with respect to the detection plane, by a focusing distance, which is preferably comprised between 10 µm and 2 mm.

Whatever the embodiment, the method may comprise any one of the following features, implemented alone or in any technically realizable combination:
  the detection spectral band is comprised between 800 nm and 1200 nm or between 800 nm and 1000 nm;
  the illumination spectral band is comprised between 800 nm and 1200 nm or between 800 nm and 1000 nm;
  the illumination spectral band has a bandwidth narrower than or equal to 50 nm, and preferably narrower than 20 nm;
  the detection spectral band has a bandwidth narrower than or equal to 50 nm, and preferably narrower than 20 nm;
  the detection spectral band is defined by a high-pass or band-pass detection filter placed on the image sensor, the detection filter being configured to block wavelengths in the visible spectral band; the detection filter may notably be placed between the image sensor and the sample;
  the illumination spectral band is defined by an illumination filter, coupled to the light source; the illumination filter may notably be placed between the light source and the sample;
  in step b), the image sensor is exposed to an exposure light wave; the method may then comprise applying a holographic reconstruction operator to the image acquired in b), so as to obtain an image representative of a complex expression of the exposure light wave. The complex expression may be defined on a reconstruction surface, for example a reconstruction plane, lying facing the image sensor, at a nonzero reconstruction distance from the latter. The reconstruction surface is preferably a plane in which the sample lies. The application of the holographic reconstruction operator may be achieved by implementing an iterative holographic reconstruction algorithm, so as to determine a phase of the exposure light wave in the sample plane or in a detection plane in which the image sensor lies.

A second subject of the invention is a device for observing a sample, comprising:
  a light source, configured to emit an illuminating beam that propagates toward the sample, in an illumination spectral band;
  a pixelated image sensor, comprising at least 10000 pixels, and configured to acquire an image in a detection spectral band;
  a holder, arranged to hold the sample between the light source and the image sensor;
the device being configured such that no image-forming optics are placed between the image sensor and the sample when the sample is held on the holder;
the device being characterized in that:
  the detection spectral band lies above 800 nm;

the detection spectral band blocks wavelengths in a visible spectral band, lying at least between 400 nm and 750 nm, or at least between 400 nm and 780 nm.

According to one embodiment, no image-forming optics are placed between the sample and the image sensor. According to another embodiment, the device comprises an optical system, placed between the sample and the image sensor, the optical system having an object focal plane and an image focal plane. The device is then such that:

the object focal plane is offset with respect to a plane in which the sample lies, by a focusing distance, which is preferably comprised between 10 µm and 2 mm and/or the focal plane is offset with respect to the detection plane, by a focusing distance, which is preferably comprised between 10 µm and 2 mm.

Whatever the embodiment, the method may comprise any one of the following features, implemented alone or in any technically realizable combination:

the detection spectral band is comprised between 800 nm and 1200 nm or between 800 nm and 1000 nm;

the image sensor is coupled to a detection filter, defining the detection spectral band;

the illumination spectral band is comprised between 800 nm and 1200 nm or between 800 nm and 1000 nm;

the illumination spectral band has a bandwidth narrower than or equal to 50 nm, and preferably narrower than 20 nm;

the detection spectral band has a bandwidth narrower than or equal to 50 nm, and preferably narrower than 20 nm;

the light source is a source of laser light;

the light source is a light-emitting diode;

the light source is coupled to an illumination filter, the illumination filter defining the illumination spectral band;

the device comprises a processing unit configured to apply a holographic reconstruction operator to the image acquired by the image sensor, so as to obtain a complex image of an exposure light wave to which the image sensor is exposed during the acquisition of the image.

Other advantages and features will become more clearly apparent from the following description of particular embodiments of the invention, which are given by way of nonlimiting example, and shown in the figures listed below.

FIGURES

Figure 3A:
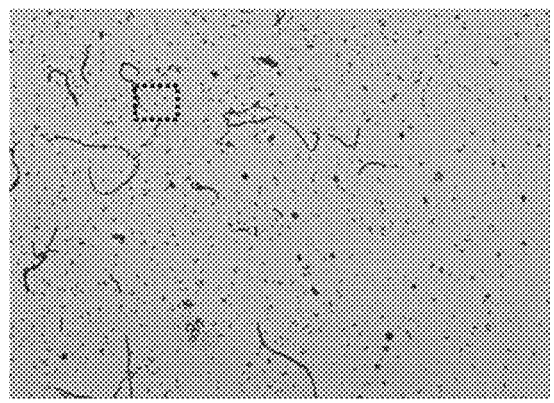
Figure 3B:
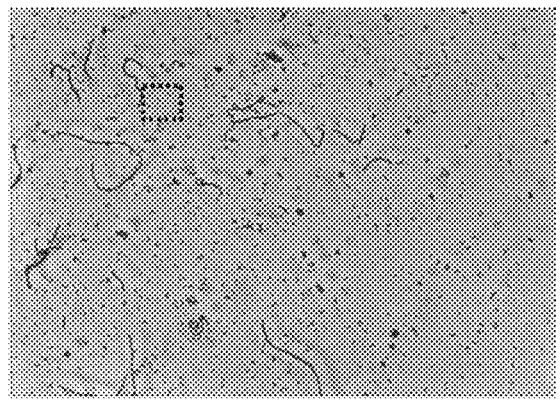
Figure 3C:
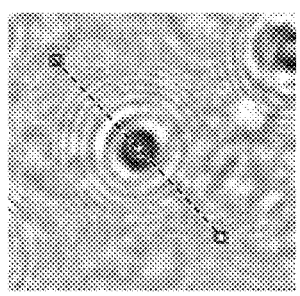
Figure 3D:
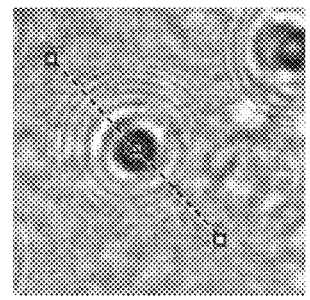
Figure 3E:
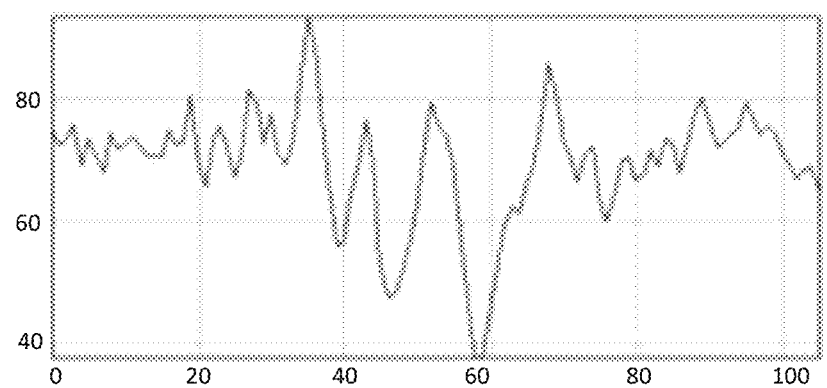
Figure 3F:
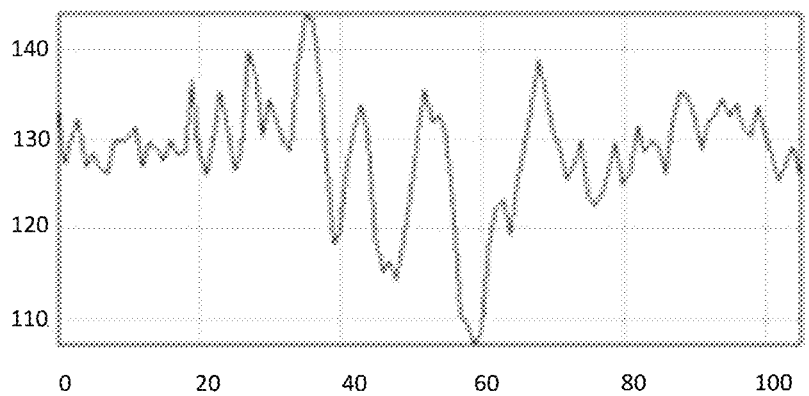

FIGS. 3A and 3B are examples of images acquired using a reference device according to the prior art and according to the invention, respectively. FIGS. 3C and that 3D are details of regions of interest delineated in FIGS. 3A and 3B, respectively. FIGS. 3E and 3F are profiles obtained from the FIGS. 3C and 3D, respectively, along lines respectively drawn on the latter.

Figure 4:
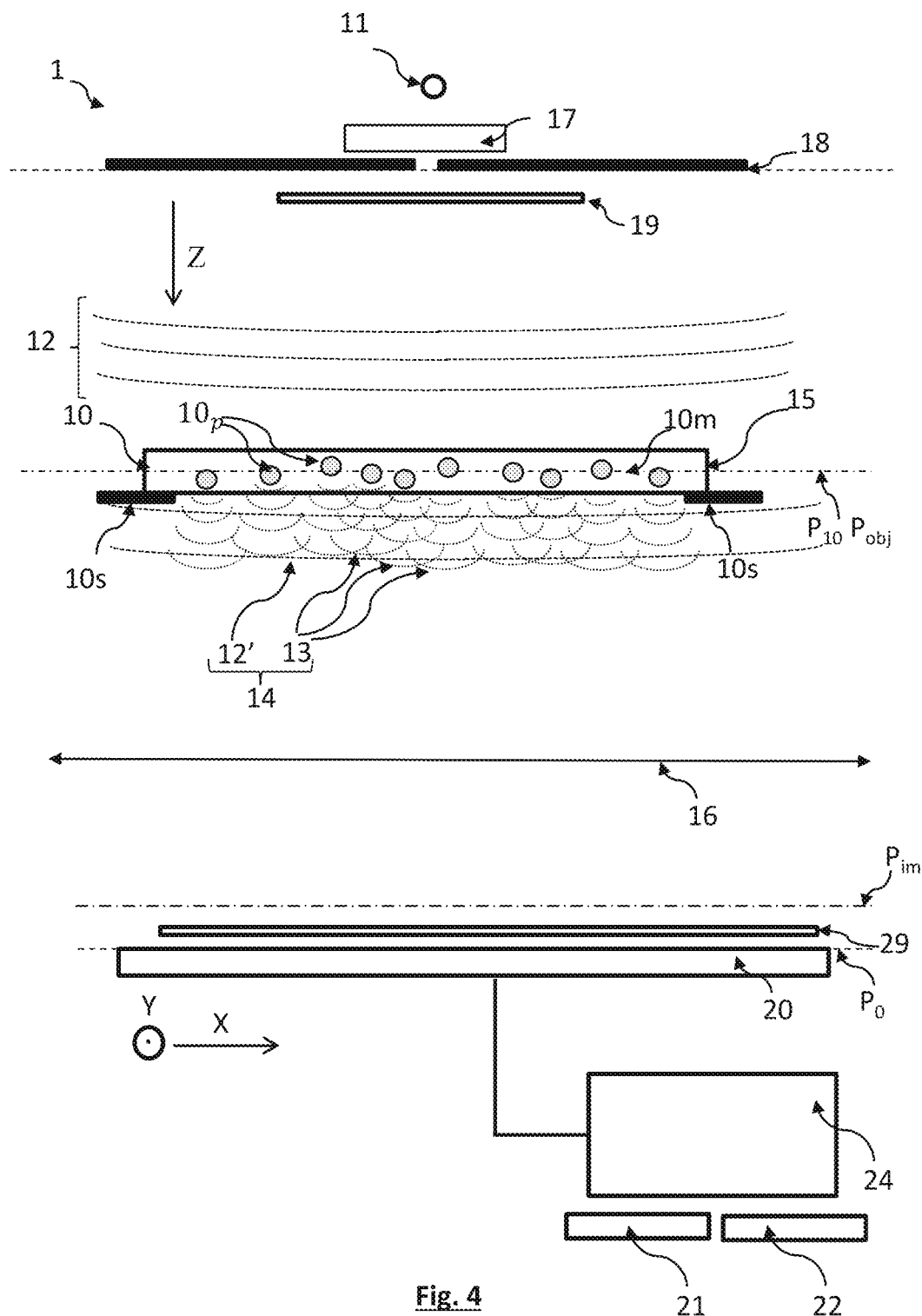

FIG. 4 shows another embodiment of a device.

DESCRIPTION OF PARTICULAR EMBODIMENTS

Figure 1A:
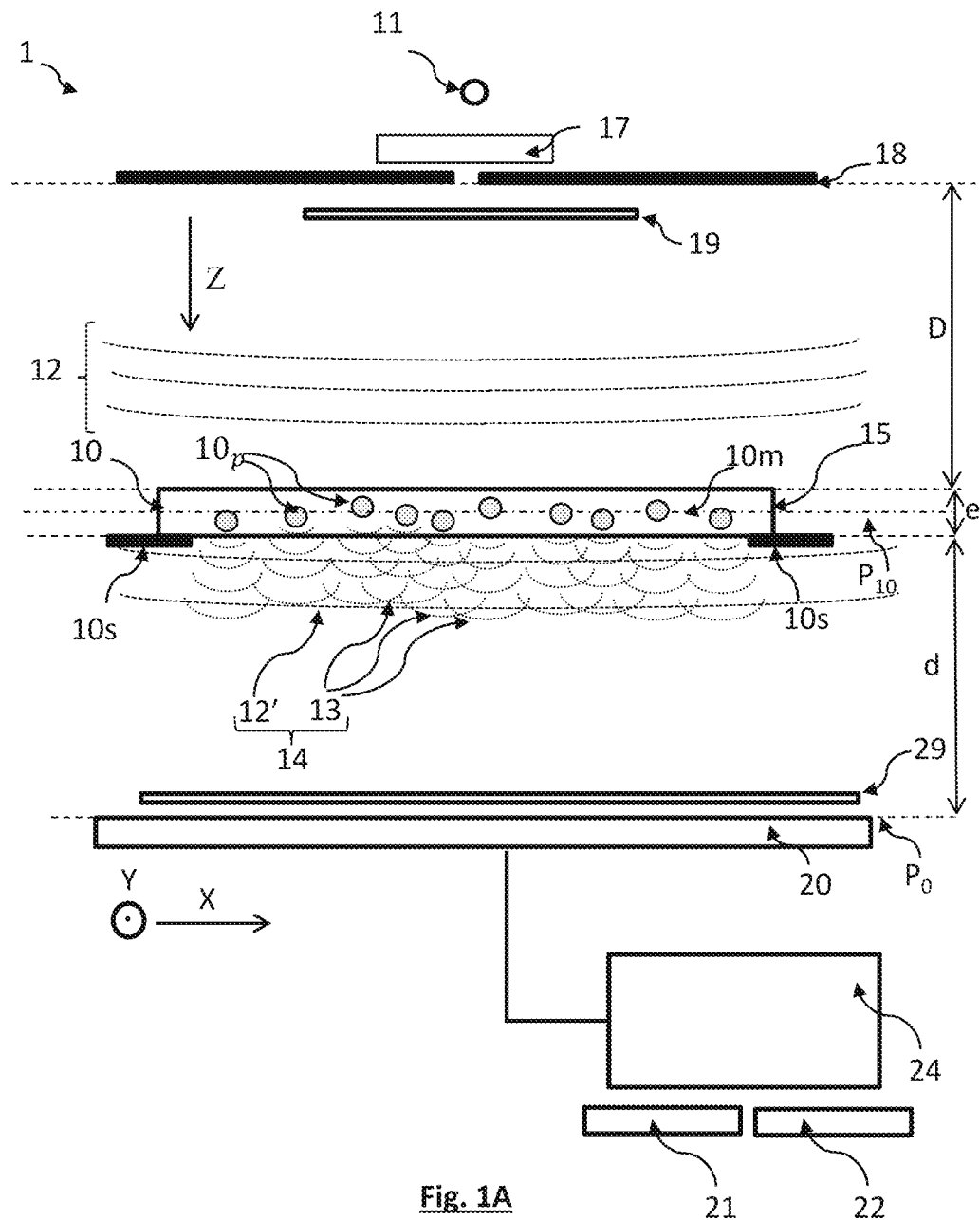
FIGS. 1A and 1B are examples of devices according to the invention.

FIG. 1A shows an example of a device 1 allowing the invention to be implemented. A light source 11 is configured to emit a light beam 12, called the illuminating beam, which propagates in the direction of a sample 10. The illuminating beam reaches the sample by propagating along a propagation axis Z.

The illuminating beam is emitted in an illumination spectral band $\Delta\lambda_{12}$. The illumination spectral band $\Delta\lambda_{12}$ preferably lies outside of the visible spectral band. By visible spectral band, what is meant is a spectral band comprised between 400 nm and 750 nm, or between 400 and 780 nm. Preferably, the illumination spectral band $\Delta\lambda_{12}$ lies between 750 nm or 780 nm and 10 µm, and preferably between 800 nm and 10 µm, and preferably between 750 nm or even 800 nm and 5 µm, and more preferably between 750 nm or even 800 nm and 2 µm, or between 750 nm or even 800 nm and 1200 nm, or between 750 nm or even 800 nm and 1000 nm.

By lies between m and n, m and n representing wavelength values, what is meant is that more than 80% of the intensity of the emitted light, or even more than 90% or 95% of the emitted intensity, is comprised between m and n. The term lies between m and n does not necessarily mean extend from m to n.

The sample 10 is a sample that it is desired to characterize. It notably comprises a medium $10_m$ in which particles $10_p$ bathe. The medium $10_m$ may be a liquid medium. It may comprise a bodily liquid, for example obtained from blood or urine or lymph or cerebrospinal fluid. It may also be a question of a culture medium, comprising nutriments allowing microorganisms or cells to develop. By particle, what is notably meant, non-exhaustively, is:

a cell, whether it be a question of a cultured cell or a bodily cell, a blood cell for example;

a microorganism, for example a bacterium or a yeast or a microalgae;

a solid particle, for example a microsphere, the microsphere possibly being functionalized, so as to promote the graft of an analyte;

a particle forming an emulsion in the medium $10_m$, in particular a particle that is insoluble in the medium $10_m$, an example being a lipid droplet in an aqueous medium.

A particle $10_p$ may be solid or liquid.

The sample 10 may be a thin slide of biological tissue, such as a pathology slide. The thickness of such a slide is of the order of a few tens of microns.

The sample 10 is, in this example, contained in a fluidic chamber 15. The fluidic chamber 15 is for example a Gene Frame® fluidic chamber of thickness e=250 µm. The thickness e of the sample 10, along the propagation axis, typically varies between 10 µm and 1 cm, and is preferably comprised between 20 µm and 500 µm. The sample lies in a plane $P_{10}$, called the sample plane. The sample plane $P_{10}$ is preferably perpendicular to the propagation axis Z, or substantially perpendicular to the latter. By substantially perpendicular, what is meant is perpendicular to within an angular tolerance, for example to within ±10% or ±20%. The sample plane is defined by the axes X and Y shown in FIGS. 1A and 1B. The sample is held on a holder $10s$ at a distance d from an image sensor 20.

The distance D between the light source 11 and the fluidic chamber 15 is preferably larger than 1 cm. It is preferably comprised between 2 and 30 cm. Advantageously, the light source 11, seen by the sample, may be considered to be point-like. This means that its diameter (or its diagonal) is preferably smaller than one tenth and better still one hundredth of the distance between the fluidic chamber 15 and the light source. In FIG. 1A, the light source is a light-emitting diode. It is generally associated with a diaphragm 18, or spatial filter. The aperture of the diaphragm is typically comprised between 5 μm and 1 mm, and preferably between 50 μm and 500 μm.

The diaphragm may be replaced by an optical fibre, a first end of which is placed facing the light source 11 and a second end of which is placed facing the sample 10. The device shown in FIG. 1A also comprises a diffuser 17, placed between the light source 11 and the diaphragm 18. The use of such a diffuser allows constraints on the centeredness of the light source 11 with respect to the aperture of the diaphragm 18 to be relaxed, as described in EP3221688.

Figure 1B:
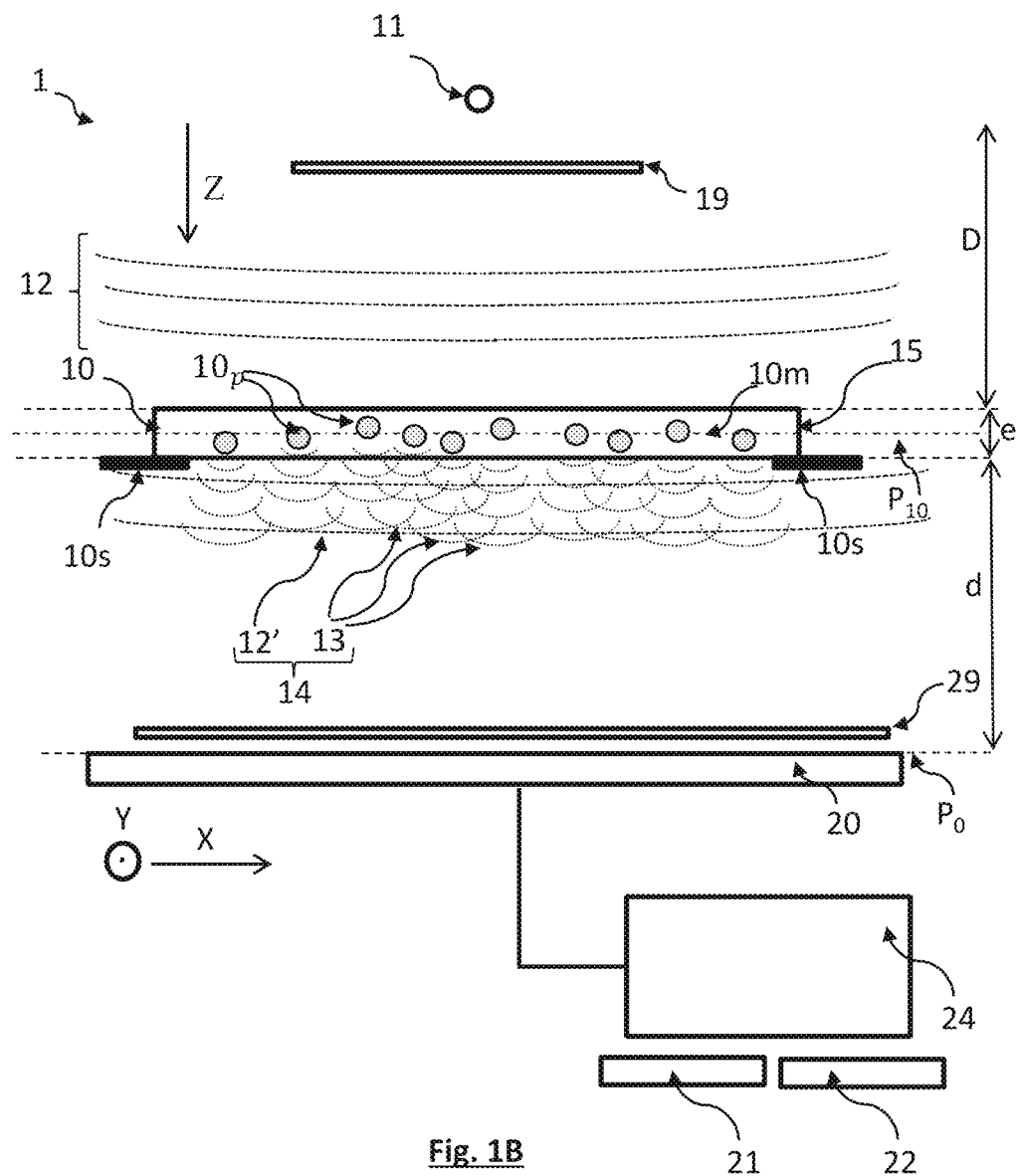

Alternatively, the light source may be a laser source, such as a laser diode, as shown in FIG. 1B. In this case, it is not useful to associate therewith a spatial filter or a diffuser.

Preferably, the illumination spectral band $\Delta\lambda_{42}$ has a bandwidth narrower than 100 nm. By spectral bandwidth what is meant is a full width at half maximum of said spectral band. Preferably, the illumination spectral bandwidth $\Delta\lambda_{12}$ is narrower than 50 nm, or even narrower than or equal to 20 nm.

The sample 10 is placed between the light source 11 and the image sensor 20. The image sensor 20 defines a detection plane $P_0$, preferably lying parallel, or substantially parallel to the plane $P_{10}$ in which the sample lies. The expression substantially parallel means that the two elements may not be rigorously parallel, an angular tolerance of a few degrees, of the order of ±20° or ±10° being acceptable.

The image sensor 20 is able to form an image $I_0$ of the sample 10 in the detection plane $P_0$. In the example shown, it is a question of a CCD or CMOS image sensor 20 comprising a matrix array of pixels. The image sensor comprises a number of pixels preferably higher than 10000, and more preferably higher than 100000. The detection plane $P_0$ preferably lies perpendicular to the propagation axis Z. The distance d between the sample 10 and the matrix array of pixels of the image sensor is preferably comprised between 50 μm and 2 cm, and more preferably comprised between 100 μm and 2 mm.

The absence of image-forming or magnifying optics between the image sensor 20 and the sample 10 in this embodiment will be noted. This does not prevent focusing micro-lenses potentially being present level with each pixel of the image sensor 20, said micro-lenses not performing the function of magnifying the image acquired by the image sensor, their function being to optimize detection effectiveness.

The image sensor 20 is configured to form an image in a detection spectral band $\Delta\lambda_{20}$. Advantageously, the detection spectral band does not lie in the visible spectral band, or if it does does so negligibly. It preferably lies between 750 nm or 780 nm and 10 μm, and preferably between 800 nm and 10 μm, and more preferably between 750 nm or even 800 nm and 5 μm, and even more preferably between 750 nm or even 800 nm and 2 μm, or between 750 nm or even 800 nm and 1200 nm, or between 750 nm or even 800 nm and 1000 nm. Because it lies outside of the visible spectral band, the detection spectral band $\Delta\lambda_{20}$ allows images to be acquired when the device 1, and notably the image sensor 20, is exposed to ambient light, in the visible spectral band. The detection spectral band is configured such that the image acquired by the image sensor 20 is not affected, or affected negligibly, by the ambient light. Thus, the device 1 may be used without it being necessary to place it in a chamber that is impermeable to light. It may be used in ambient light. The ambient-light level in which the device is able to operate depends on the fraction of the visible spectral band detected by the image sensor.

Preferably, the detection spectral band $\Delta\lambda_{20}$ has a bandwidth narrower than 100 nm. By spectral bandwidth, what is meant is a full width at half maximum of said spectral band. Preferably, the width of the detection spectral band $\Delta\lambda_{20}$ is narrower than 50 nm, or even narrower than or equal to 20 nm.

It will be understood that the detection spectral band $\Delta\lambda_{20}$ and the illumination spectral band $\Delta\lambda_{12}$ overlap at least partially.

The detection spectral band $\Delta\lambda_{20}$ may be defined by the intrinsic properties of the pixels. The image sensor then comprises pixels able to detect photons solely in the detection spectral band. More simply, the detection spectral band $\Delta\lambda_{20}$ may be defined by a detection filter 29, of high-pass or band-pass type, placed between the image sensor 20 and the sample 10. Analogously, the illumination spectral band $\Delta\lambda_{12}$ may be defined by the intrinsic properties of the light source 11. This is notably the case when the light source is a laser, as shown in FIG. 1B. The illumination spectral band may be defined by an illumination filter 19, placed between the light source and the sample. Use of an illumination filter 19 is conventional when the light source 11 is a white light source or a light-emitting diode.

Figure 2:
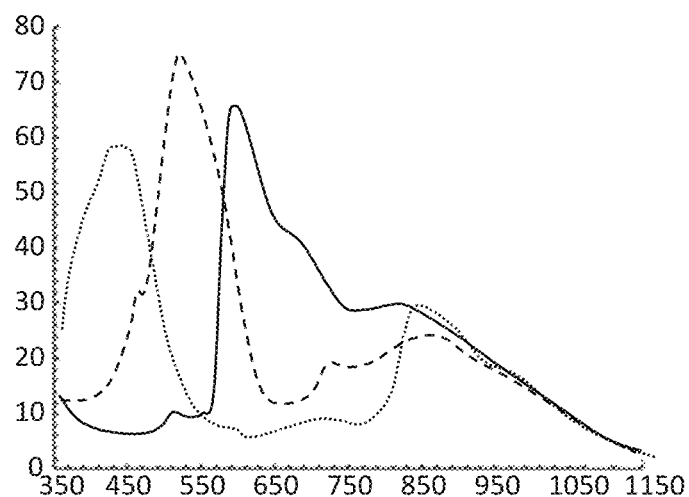
FIG. 2 shows the transmission spectral bands of a Bayer filter.

The image sensor 20 may be an RGB CMOS sensor comprising pixels the detection spectral band of which is defined by a Bayer filter. Thus, the pixels of the image sensor are sensitive in spectral bands corresponding to the colours red, green and blue of the visible spectral band, respectively. FIG. 2 shows the detection passbands defined by the Bayer filter. The x-axis corresponds to wavelength, expressed in nm, whereas the y-axis corresponds to the transmission, i.e. to the percentage of light flux transmitted. The dotted, dashed and solid curves correspond to the passbands in the blue, green and red, respectively. This type of curve is conventional in the field of standard RGB image sensors. It may be seen that beyond 850 nm, the transmission is equivalent in each spectral band. Beyond 1000 nm, the transmission decreases. Thus, when the image sensor is a standard RGB sensor, it is preferable for the detection spectral band to be comprised in the interval [750 nm-1100 nm], and preferably in the interval [850 nm-1000 nm]. The same goes for the illumination spectral band. Pixels the transmission of which is uniform, while being sufficient to form an exploitable images, are then obtained. The image sensor 20 then behaves as a monochromic sensor. With this type of image sensor, i.e. one comprising a Bayer filter, the detection spectral band is defined by a high-pass or band-pass detection filter 29 defining the detection passband.

As mentioned in the patent applications cited with respect to the prior art, under the effect of the incident light wave 12, the particles $10_p$ present in the sample may generate a diffracted wave 13, liable to produce, in the detection plane $P_0$, interference, in particular with a portion 12' of the incident light wave 12 transmitted by the sample. Moreover, the sample 10 may absorb some of the incident light wave 12. Thus, the light wave 14, transmitted by the sample, and to which the image sensor 20 is exposed, which light wave is called the "exposure light wave". The exposure light wave 14 may comprise:
- a component 13 resulting from the diffraction of the incident light wave 12 by each particle of the sample;
- a component 12' resulting from the transmission of the incident light wave 12 by the sample, some of the latter possibly being absorbed in the sample.

These components form interference in the detection plane. Thus, the image $I_0$ acquired by the image sensor comprises interference patterns (or diffraction patterns), each interference pattern possibly being associated with one particle $10_p$ of the sample.

A processing unit 21, for example a microprocessor, is able to process each image $I_0$ acquired by the image sensor 20. In particular, the processing unit 21 is a microprocessor connected to a programmable memory 22 in which a sequence of instructions for performing the image-processing and computing operations described in this description is stored. The processing unit may be coupled to a screen 24 allowing images acquired by the image sensor 20 or computed by the processor 21 to be displayed.

An image $I_0$ acquired by the image sensor 20, also referred to as a hologram, may be subjected to a reconstruction, called a holographic reconstruction. As described with reference to the prior art, it is possible to apply, to the image $I_0$ acquired by the image sensor 20, a holographic propagation operator h, so as to compute a complex amplitude $A(x,y,z)$ representative of the exposure light wave 14, and to do so for every point of coordinates $(x,y,z)$ of the space, and more particularly between the image sensor 20 and the sample 10. The coordinates $(x,y)$ designate coordinates, called radial coordinates, parallel to the detection plane $P_0$. The coordinate z is a coordinate along the propagation axis Z, expressing a distance between the sample 10 and the image sensor 20.

The complex amplitude may be obtained using one of the following expressions:
$A(x,y,z)=I_0(x,y,z)*h$ * designating the convolution operator, or, and preferably,
$A(x,y,z)=\sqrt{I_0(x,y,z)}*h$, or even:

$$A(x, y, z) = \frac{\sqrt{I_0(x, y, z)}}{\overline{I_0}} * h,$$

$\overline{I_0}$ being a mean of the acquired image.

The function of the propagation operator h is to describe the propagation of light between the image sensor 20 and a point of coordinates $(x,y,z)$, located at a distance $|z|$ from the image sensor. The propagation operator is for example the Fresnel-Helmholtz function, such that:

$$h(x, y, z) = \frac{1}{j\lambda z}e^{j2\pi\frac{z}{\lambda}}\exp\left(j\pi\frac{x^2+y^2}{\lambda z}\right).$$

It is then possible to determine a property of the exposure light wave 14, for example the modulus $M(x,y,z)$ and/or the phase $\varphi(x,y,z)$, at the distance $|z|$, with:

$M(x,y,z)=abs[A(x,y,z)]$;

$\varphi(x,y,z)=arg[A(x,y,z)]$;

The operators abs and arg respectively designate the modulus and argument.

The distance $|z|$ is a reconstruction distance.

The complex expression $A(x,y,z)$ of the light wave 14 at any point of coordinates $(x,y,z)$ of the space, is such that:
$(x,y,z)=M(x,y,z)e^{j\varphi(x,y,z)}$.

The complex expression A is a complex quantity the argument and modulus of which are respectively representative of the phase and intensity of the exposure light wave 14.

By implementing holographic reconstruction algorithms, it is possible to determine the complex expression A in a reconstruction plane. The reconstruction plane is preferably parallel to the detection plane $P_0$ and/or to the sample plane $P_{10}$. A complex image $A_z$ of the exposure light wave 14 in the reconstruction plane is then obtained. Advantageously, the reconstruction plane is the plane $P_{10}$ in which the sample 10 lies. In order to obtain a holographic reconstruction of good quality, the image acquired by the image sensor may be subjected to an iterative reconstruction algorithm. Iterative reconstruction algorithms are for example described in WO2016189257 or in WO2017162985.

It is possible to form images $M_z$ and $\varphi_z$ respectively representing the modulus or the phase of a complex image $A_z$ in a plane $P_z$ located at a distance $|z|$ from the detection plane $P_0$, with $M_z=mod(A_z)$ and $\varphi_z=arg(A_z)$. When the reconstruction plane $P_z$ corresponds to a plane in which the sample lies, the images $M_z$ and $\varphi_z$ allow the sample 10 to be observed with a correct spatial resolution.

Trials

A trial was carried out using a reference device and a device according to the invention. Each device comprises:
an infrared LED light source, emitting about a central wavelength equal to 980 nm, of 20 nm bandwidth (±10 nm on either side of the central wavelength);
an 8-bit IDS UI-1492LE-M CMOS image sensor composed of 3884×2764 square pixels of 1.67 µm side length;
a diaphragm defining a 150 µm aperture placed next to the light source.

The reference device was placed in a dark chamber, forming a chamber that was impermeable to light. The device according to the invention comprises a detection filter 29 placed directly on the image sensor, defining a detection spectral band centred on 980 nm and of spectral width equal to 10 nm. Thus, the detection spectral band lay between 975 nm and 985 nm. In this example, the device according to the invention is used in daylight.

A sample, containing micron-sized particles in aqueous solution, was placed at a distance of 1.5 mm from the image sensor. FIGS. 3A and 3B are respectively images acquired by the image sensor, with the reference device and with the device according to the invention, respectively. In these figures, zones of interest have been delineated by dashed lines. FIGS. 3C and 3D correspond to the zoomed-in images of the regions of interest. FIGS. 3E and 3F show intensity profiles produced with each figure, along a dashed line. These profiles show that the image quality was equivalent with both devices.

according to another embodiment, schematically shown in FIG. 4, an image-forming optical system 16 is placed between the sample and the image sensor, the image sensor being arranged in a what is called a defocused configuration. The image-forming optic 16 may comprise a lens or an objective. The image-forming optic 16 defines an object focal plane $P_{obj}$ and an image focal plane $P_m$. In the defocused configuration:
the object focal plane $P_{obj}$ is offset from the plane in which the sample lies by a distance called the defocus distance;
and/or the image focal plane is offset from the detection plane by a distance called the defocus distance.

The defocus distance may be comprised between 5 µm and 5 mm, and preferably between 10 µm and 2 mm. In the same way as in a lensless configuration, such a configuration allows an image to be obtained in which diffracting elements of the sample, particles for example, appear in the form of diffraction patterns, interference occurring between the light wave emitted by the light source and propagating to the image sensor and a diffracted wave generated by each diffracting element of the sample. In the example of FIG. 4, the object plane $P_{obj}$ is coincident with the sample plane $P_{10}$. The image plane $P_m$ is offset with respect to the detection plane $P_0$. The features described with reference to the embodiment shown in FIGS. 1A and 1B may be applied to the defocused configuration.

However, a lensless-imaging configuration is preferred, because of the larger observation field that it procures.

The invention will possibly be employed to observe samples in the field of biology or health, or in other industrial fields, for example food processing and/or environmental inspection.

The invention claimed is:

1. A method for observing a sample, comprising:
    placing the sample between a light source and an image sensor so that the light source is positioned on a first side of the sample and the image sensor is positioned on a second side of the sample opposite the first side, the image sensor having at least 10000 pixels;
    emitting an illumination beam from the light source, which propagates to the sample, the illuminating light beam being emitted in an illumination spectral band lying above 800 nm;
    illuminating the sample with the light source; and
    acquiring an image of the sample with the image sensor, no image-forming optics being placed between the sample and the image sensor,
    wherein:
    the image sensor is configured such that it has a detection spectral band that blocks wavelengths in a visible spectral band, lying at least between 400 nm and 750 nm, such that the image may be acquired in ambient light;
    the illumination spectral band has a bandwidth narrower than or equal to 100 nm; and
    the image sensor is placed less than 20 mm from the sample.

2. The method according to claim 1, wherein the detection spectral band is comprised between 800 nm and 1200 nm or between 800 nm and 1000 nm.

3. The method according to claim 1, wherein the illumination spectral band is comprised between 800 nm and 1200 nm or between 800 nm and 1000 nm.

4. The method according to claim 1, wherein:
    the illumination spectral band has a bandwidth narrower than or equal to 50 nm, and preferably narrower than 20 nm; and/or
    the detection spectral band has a bandwidth narrower than or equal to 50 nm, and preferably narrower than 20 nm.

5. The method according to claim 1, wherein the detection spectral band is defined by a high-pass or band-pass detection filter placed on the image sensor, the detection filter being configured to block wavelengths in the visible spectral band.

6. The method according to claim 1, wherein the illumination spectral band is defined by an illumination filter, coupled to the light source.

7. The method according to claim 1, wherein, in acquiring the image of the sample, the image sensor is exposed to an exposure light wave, the method further comprising:
    applying a holographic reconstruction algorithm to the acquired image, the holographic reconstruction algorithm using a propagation operator, the propagation operator describing the propagation of light between the image sensor and a reconstruction plane so as to determine a complex expression of the exposure light wave in different points of the reconstruction plane, the complex expression being a complex number, the argument and modulus of the complex number are respectively representative of the phase and intensity of the exposure light wave; and
    obtaining an image representative of the complex expression of the exposure light wave in the different points of the reconstruction plane.

8. The method according to claim 7, wherein the reconstruction plane is a plane in which the sample lies.

9. The method according to claim 1, wherein the sample is placed at a distance of 2 cm to 30 cm from the light source.

10. A device for observing a sample, comprising:
    a light source, configured to emit an illuminating beam that propagates toward the sample, in an illumination spectral band;
    a pixelated image sensor, comprising at least 10000 pixels, and configured to acquire an image in a detection spectral band;
    a holder, arranged to hold the sample between the light source and the image sensor so that the light source is positioned on a first side of the sample and the image sensor is positioned on a second side of the sample opposite the first side;
    the device being configured such that no image-forming optics are placed between the image sensor and the sample when the sample is held on the holder and such that the image sensor is placed less than 20 mm from the sample when the sample is held on the holder;
    wherein:
    the detection spectral band lies above 800 nm;
    the detection spectral band blocks wavelengths in a visible spectral band, lying at least between 400 nm and 750 nm;
    the illumination spectral band has a bandwidth narrower than or equal to 100 nm.

11. The device according to claim 10, wherein the detection spectral band is comprised between 800 nm and 1200 nm or between 800 nm and 1000 nm.

12. The device according to claim 10, wherein the image sensor is coupled to a detection filter, defining the detection spectral band.

13. The device according to claim 10, wherein the illumination spectral band is comprised between 800 nm and 1200 nm or between 800 nm and 1000 nm.

14. The device according to claim 10, wherein:
    the illumination spectral band has a bandwidth narrower than or equal to 50 nm, and preferably narrower than 20 nm; and/or
    the detection spectral band has a bandwidth narrower than or equal to 50 nm, and preferably narrower than 20 nm.

15. The device according to claim 10, wherein:
    the light source is a source of laser light; or
    the light source is a light-emitting diode coupled to an illumination filter, the illumination filter defining the illumination spectral band.

16. The device according to claim 10, comprising a processing unit configured to:
    apply a holographic reconstruction algorithm to the acquired image, the holographic reconstruction algorithm using a propagation operator, the propagation operator describing the propagation of light between the image sensor and a reconstruction plane so as to determine a complex expression of the exposure light wave in different points of the reconstruction plane, the complex expression being a complex number, the argument and modulus of the complex number are respectively representative of the phase and intensity of the exposure light wave; and obtain an image representative of the complex expression of the exposure light wave in the different points of the reconstruction plane.

17. The device according to claim 16, wherein the reconstruction plane is a plane in which the sample lies.

18. A device for observing a sample, comprising:
a light source, configured to emit an illuminating beam that propagates toward the sample, in an illumination spectral band;
a pixelated image sensor, comprising at least 10000 pixels, and configured to acquire an image in a detection spectral band;
a holder, arranged to hold the sample between the light source and the image sensor so that the light source is positioned on a first side of the sample and the image sensor is positioned on a second side of the sample opposite the first side;
an optical system, placed between the sample and the pixelated image sensor, the optical system having an object focal plane and an image focal plane;
the device being configured such that:
the object focal plane is offset with respect to a plane in which the sample lies, by an object offset;
and/or the image focal plane is offset with respect to a detection plane, by an image offset,
wherein the detection spectral band lies above 800 nm,
wherein the detection spectral band blocks wavelengths in a visible spectral band, lying at least between 400 nm and 750 nm, and
wherein the illumination spectral band has a bandwidth narrower than or equal to 100 nm.

19. The device according to claim 18, wherein the image offset or the object offset is comprised between 10 μm and 2 mm.

* * * * *